United States Patent
Fabris

(10) Patent No.: US 6,526,795 B1
(45) Date of Patent: Mar. 4, 2003

(54) EXPANDING SPLINE DRIVE FOR HIGH TORQUE

(76) Inventor: Mario Fabris, 188 North Service Road, Grimsby ONT (CA), L3M 4E8

( * ) Notice: Subject to any disclaimer, the term of this patent is extended or adjusted under 35 U.S.C. 154(b) by 0 days.

(21) Appl. No.: 09/567,772

(22) Filed: May 9, 2000

(51) Int. Cl.$^7$ ............................................... B21B 35/14
(52) U.S. Cl. ............................. 72/249; 72/237; 492/21
(58) Field of Search ............................. 72/249, 252.5, 72/237, 238; 492/1, 4, 21, 57; 269/47, 48.1; 279/42, 48, 53, 52

(56) References Cited

U.S. PATENT DOCUMENTS

| | | | |
|---|---|---|---|
| 3,650,139 A | * 3/1972 | Hinterholzl | 72/249 |
| 3,825,167 A | 7/1974 | Komorek | 279/4.11 |
| 3,886,779 A | * 6/1975 | McClain | 72/181 |
| 4,386,566 A | 6/1983 | Moss | 492/4 |
| 4,741,250 A | 5/1988 | Weyer | 92/33 |
| 4,838,103 A | 6/1989 | Weyer | 74/89.15 |
| 4,846,007 A | 7/1989 | Weyer | 74/89.15 |
| 5,031,435 A | * 7/1991 | Seto et al. | 72/238 |
| 5,314,135 A | * 5/1994 | Forrest, Jr. et al. | 269/48.1 |
| 5,556,114 A | 9/1996 | Fabris | 279/2.08 |
| 5,700,233 A | * 12/1997 | Fabris | 492/1 |

* cited by examiner

Primary Examiner—Lowell A. Larson
(74) Attorney, Agent, or Firm—Edward H. Oldham

(57) ABSTRACT

An expanding hub assembly for a capstan drive for a steel mill comprising a modified spline having a large cylindrical surface area for mating with an installed mill roll. The cylindrical surface is interspersed with a series of evenly spaced shallow axial troughs formed therein for mating with a series of shallow projecting splines on a mounted mill roll. The hub is hollow and an expansion device is present in the hollow hub for expanding the mating surface of the hub.

14 Claims, 4 Drawing Sheets

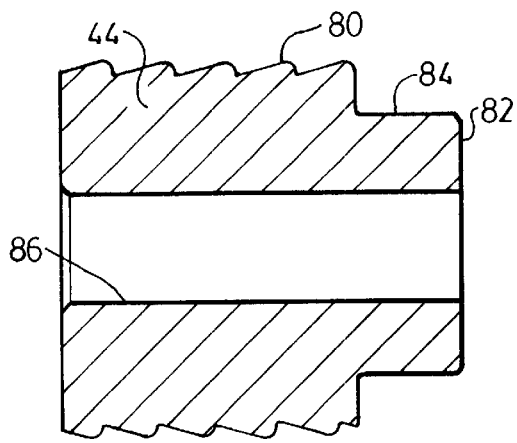
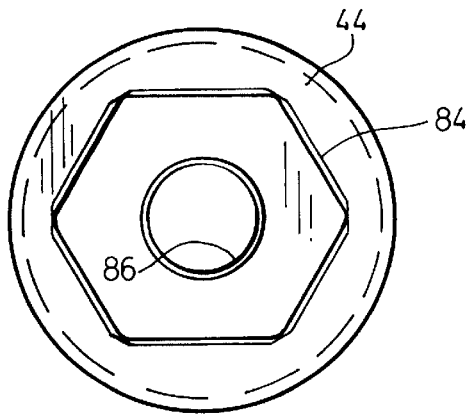
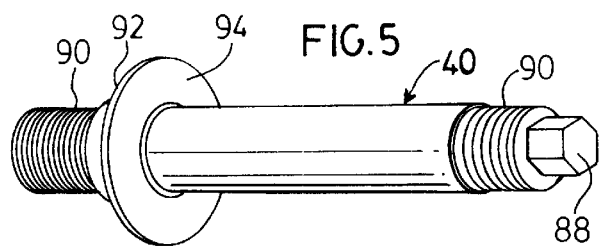
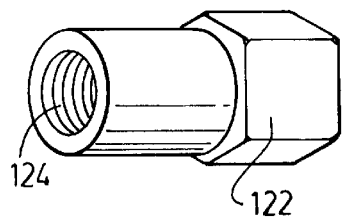
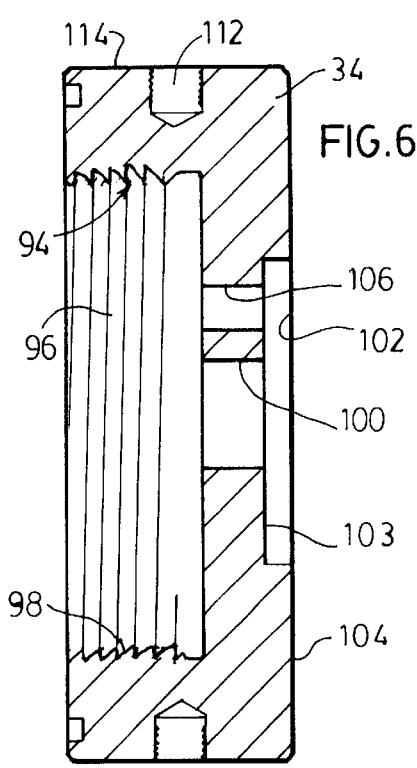
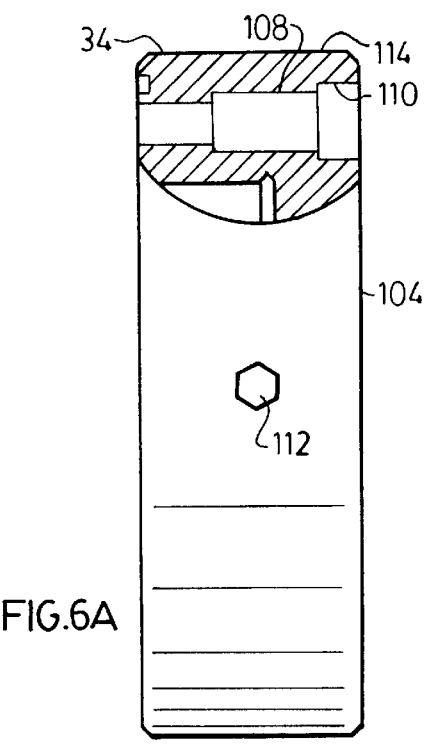

EXPANDING SPLINE DRIVE FOR HIGH TORQUE

This application relates to an improvement of U.S. Pat. No. 5,700,233 entitled SLEEVELESS CANTILEVER DRIVE FOR HIGH TORQUE APPLICATIONS, the inventor of which is M. Fabris and the contents of which are incorporated herein by reference.

BACKGROUND OF THE INVENTION

The process of reducing steel by rolling is a well developed art in the manufacture of steel products. The above mentioned U.S. Patent is capable of providing a method of mounting a roll on a driving capstan in a swift and efficient manner such that the roll and capstan rotate concentrically. The apparatus described above will function perfectly well within certain torque and roll diameter limitations.

As designers of steel mills call for increased capacity, the demand for a method of mounting a large reduction roll on a large capstan in such a manner as to transmit a large driving torque to the roll is a trend which will not be deterred.

Not only must the rotating capstan transmit torque to the reduction roll during a rolling operation with no slippage, but the roll must be capable of being mounted on the capstan in a swift and efficient manner in such a way that the roll mounted on the capstan rotates concentrically with the capstan. Also when the surface of a roll has deteriorated to the point where it must be refurbished, the roll must be capable of being quickly demounted from the capstan drive in preparation for replacement with a new or refurbished roll. This particular method of mounting a roll on the driving capstan lends itself to preserving the surface integrity of the two mating surfaces i.e. the roll and the capstan. Because the surface of the capstan is in its normal unexpanded state during the roll demounting and mounting operations, there is substantial clearance between the mating surfaces of the roll and capstan, hence little or no surface abrasion occurs during these operations.

The above U.S. Patent is perfectly capable of providing such a method of quickly demounting a used roll and remounting a new or refurbished roll on a capstan such that the capstan and the newly mounted roll rotate in a concentric relationship. It is only when certain torque and roll diameters are exceeded beyond certain prescribed limits that an alternate method of mounting and demounting must be found.

The success enjoyed by U.S. Pat. No. 5,700,233 is generally thought to have been achieved by the use of a wedge plug which is threaded into the internal cavity in the hub of a rotating capstan such that once a roll is mounted on the hub, the threaded plug is moved axially within the hub to expand the entire circumference of the hub on which the roll is mounted.

There are distinct advantages to this method of mounting a reduction roll:

1) rolls are easily mounted on the driving capstans while the capstan is in its unexpanded state,
2) when the capstan is expanded the entire circumference of the capstan is expanded uniformly under the mounted roll to provide a stable concentric mounting arrangement for the roller on the driving capstan.
3) The level of skill required to remove and replace a reducing roll with another roll which is concentrically mounted on the capstan shaft is not as great as with prior art mounting techniques.
4) Because of the simplicity of method of mounting the reducing roll on the capstan, and the reduction of components in the driving interface between the capstan and the roller, it is possible to speed up the change over time for roll replacement and thus increase the rolling capacity of the mill.
5) Wear of the mating surfaces of the roll and capstan is minimized during the life time of the capstan, because of the method of mounting the roll on the capstan and the shape of the surfaces. which eliminates roll slip on the capstan.

SUMMARY OF THE INVENTION

This invention provides a novel method of mounting and demounting rolls on a capstan drive which is ideally suited to rolls of a prescribed size wherein large driving torques and substantial reduction forces are imparted to the rolls by the driving capstans. The method of mounting the roll on the capstan of this invention includes the presence of a suitable spline drive system in the interface between the roll and the capstan.

The spline drive provides for a positive placement of the roll on the capstan mating face and the spline interface assures a positive drive with no slippage. After mounting a roll on the splined capstan the surface of the capstan mating interface is expanded, preferably by the use of a wedging plug similar to the one shown in FIG. 5 of the aforementioned patent.

Ideally it will be found that this invention will produce the best results if the projecting splines on the roll are about half the width of the upstanding intermeshing splines on the capstan. This configuration assures the easy interchange of rolls on the unexpanded interface of the capstan drive while allowing sufficient area of expansion of the capstan interface (by the wedge plug) to preserve concentricity during a rolling operation.

The presence of any infinitesimal wear which may occur on the surface of the capstan or rolls over a lifetime of the capstan in a steel mill is easily offset by the expandable surface of the capstan.

BRIEF DESCRIPTION OF THE DRAWINGS

FIGS. 4 and 4A show the wedge plug in elevational and end views.

FIG. 5 shows a perspective of a release bolt.

FIGS. 6, 6A and 6B show various views of the end cap.

FIG. 7 shows a cap for the bolt of FIG. 5.

DESCRIPTION OF THE PREFERRED EMBODIMENT

Figure 1:
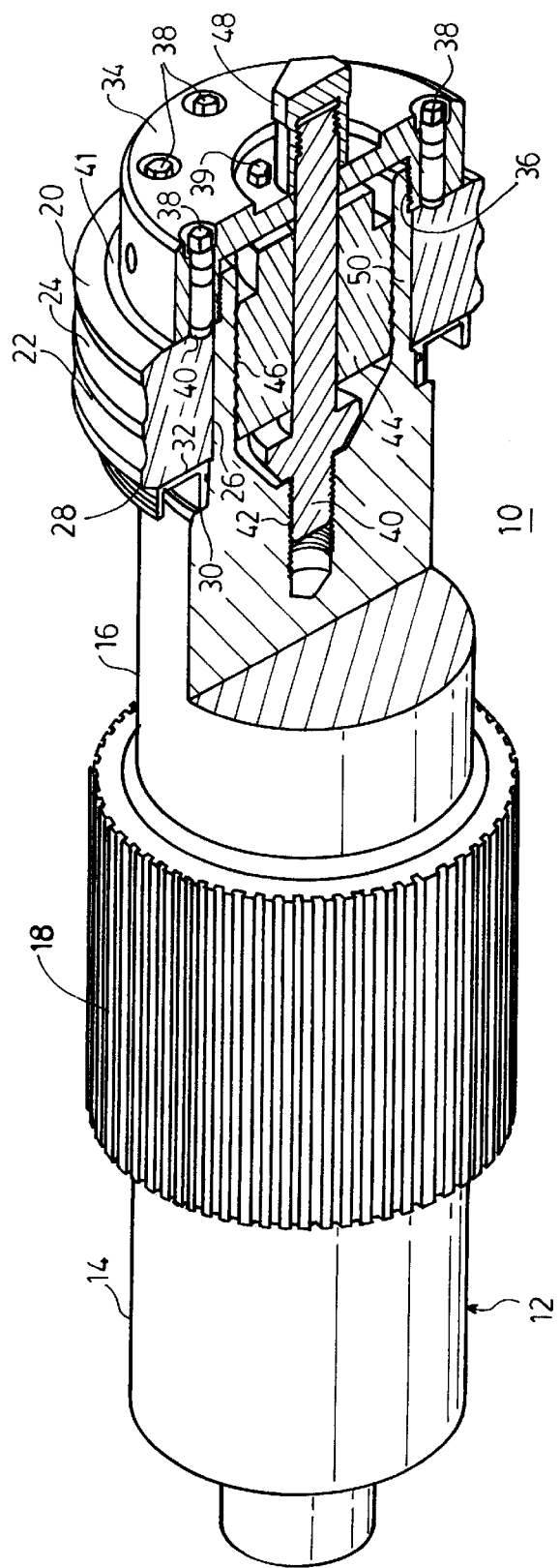
FIG. 1 is a perspective partial sectional view of the complete. assembly of this invention.

FIG. 1 shows a partial perspective sectional view of the capstan and roll showing the complete mounting assembly 10. Capstan 12 includes two spaced bearing surfaces 14 and 16 for mounting bearings (not shown) of a steel mill drive. Gear 18 is integrally formed on capstan 12 between bearings 14 and 16 to permit the capstan to be rotationally 10 driven.

A brief description of the parts of the complete assembly shown in FIG. 1 will now be given before the detailed description of each individual part is given.

A flinger 28 is shown mounted on capstan 10 between capstan shoulder 30 and the face 32 of roll 20.

A roll 20 is next shown mounted on capstan 12. Roll 20 has a pair of work engaging grooves 22 and 24 formed in the working surface thereof for shaping the steel product being reduced by the roll 20. Roll 20 is mounted on interface 26 of roll 20 and capstan 12.

A cap 34 is positioned on capstan 10 at interface 36. Bolts 38 are threaded into cap 34 and are able to press against surface 41 of roll 20 to press the roll 20 and flinger 28 against the shoulder 30.

A bolt 40 is threaded into capstan 10 at counter bore 42. The description of bolt 40 will be described later.

A wedge plug 44 having a shallow external buttress thread at capstan interface 46 is provided in the hollow cavity in capstan 12.

Locking cap 48 is provided to prevent accidental twisting of bolt 40. Three compression screws 39 are located in threaded holes in cap 34.

The various parts will now be described separately and in greater detail.

Figure 2:
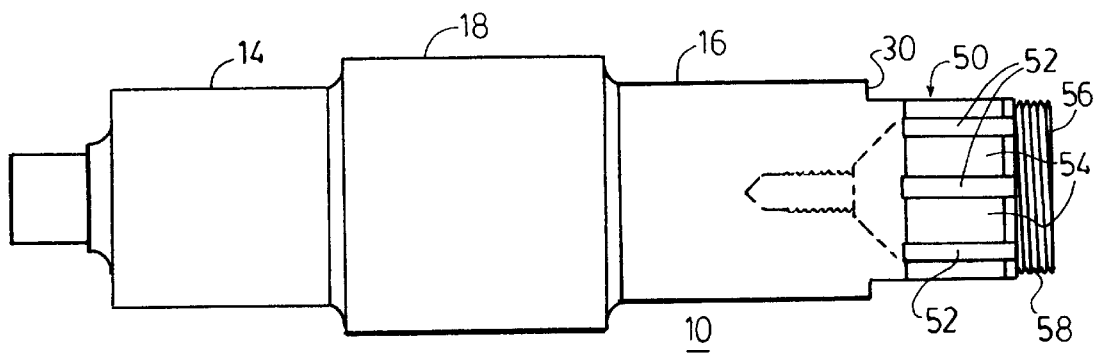
FIGS. 2 and 2A show the capstan in elevation and end views.
Figure 2A:
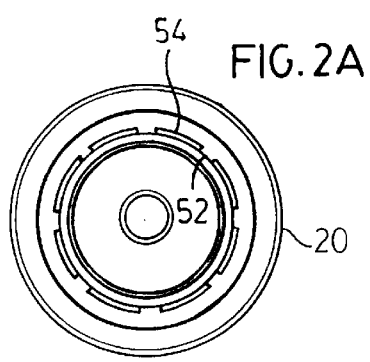
Figure 2B:
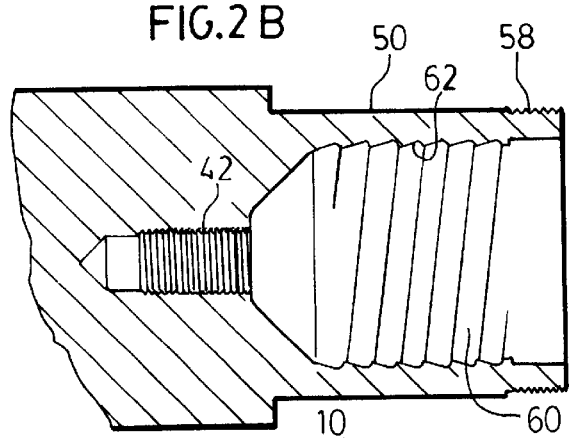
FIG. 2B shows a sectional view of the mounting hub of the capstan.

The expanding hub 50 of capstan 10 is shown in more detail in FIGS. 2, 2A and 2B. In FIG. 2 the expandable hub 50 is shown having shallow recesses or troughs 52 which resemble a series of shallow keyways formed in the cylindrical surface 54. The end 56 of the hub 50 is threaded at 58 to receive cap 34.

The hub 50 of capstan 10 contains a hollow cavity 60 as shown in FIG. 2B. The cavity 60 is provided with an internal buttress thread 62 for threadably receiving plug 44. Counter bore 42 at the remote end of cavity 60 is provided with internal threads to receive bolt 40.

Figure 3A:
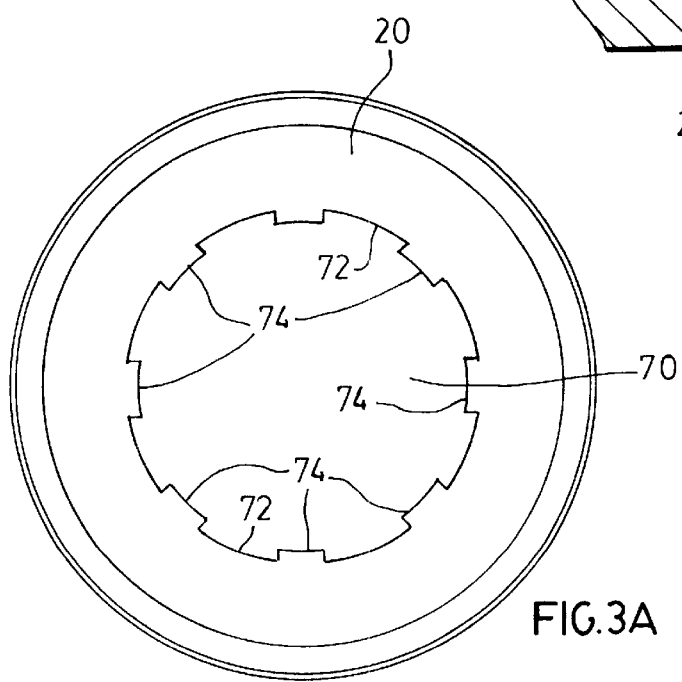
FIGS. 3 and 3A show the roll in section and elevation.
Figure 3:
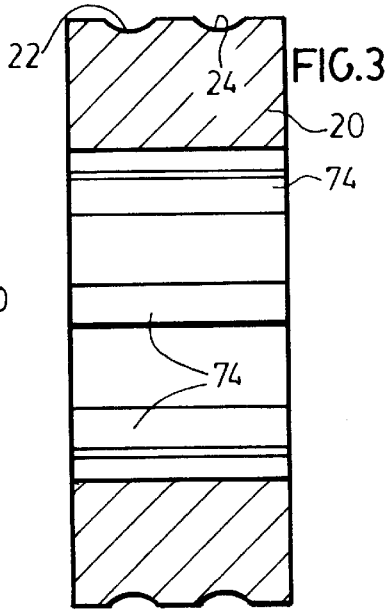

Roll 20 is shown in detail in FIGS. 3 and 3A. FIG. 3 shows roll 20 in section, having grooves 22 and 24 in the work engaging surface. The central bore 70 comprises a cylindrical surface 72 interspersed with evenly spaced inwardly protruding shallow splines 74 which will ultimately engage troughs or depressions 52 on hub 50 of capstan 10 when roll 20 is fitted on the capstan.

Plug 44 is shown in more detail in FIGS. 4 and 4A. Plug 44 is essentially a cylindraceous member having surface 80 threaded with a buttress type screw thread to match threads 62 on the interior of cavity 60 of hub 50 of capstan 10. The end 82 of plug 44 is provided with a hex head 84 for twisting plug 44 into cavity 60 of the capstan 10. Plug 44 is provided with a central bore 86.

Bolt 40 is shown in perspective in FIG. 5. One end 90 of bolt 40 is threaded into threaded bore 42 of capstan 10. A conical enlargement 92 having annular surface 94 is provided on bolt 40 adjacent threaded end 90. Shank portion 96 of bolt 40 is of such size as to be received in bore 86 of plug 44 in a sliding fit. Adjacent hex head 88 is threaded surface 90 of bolt 40.

Figure 6B:
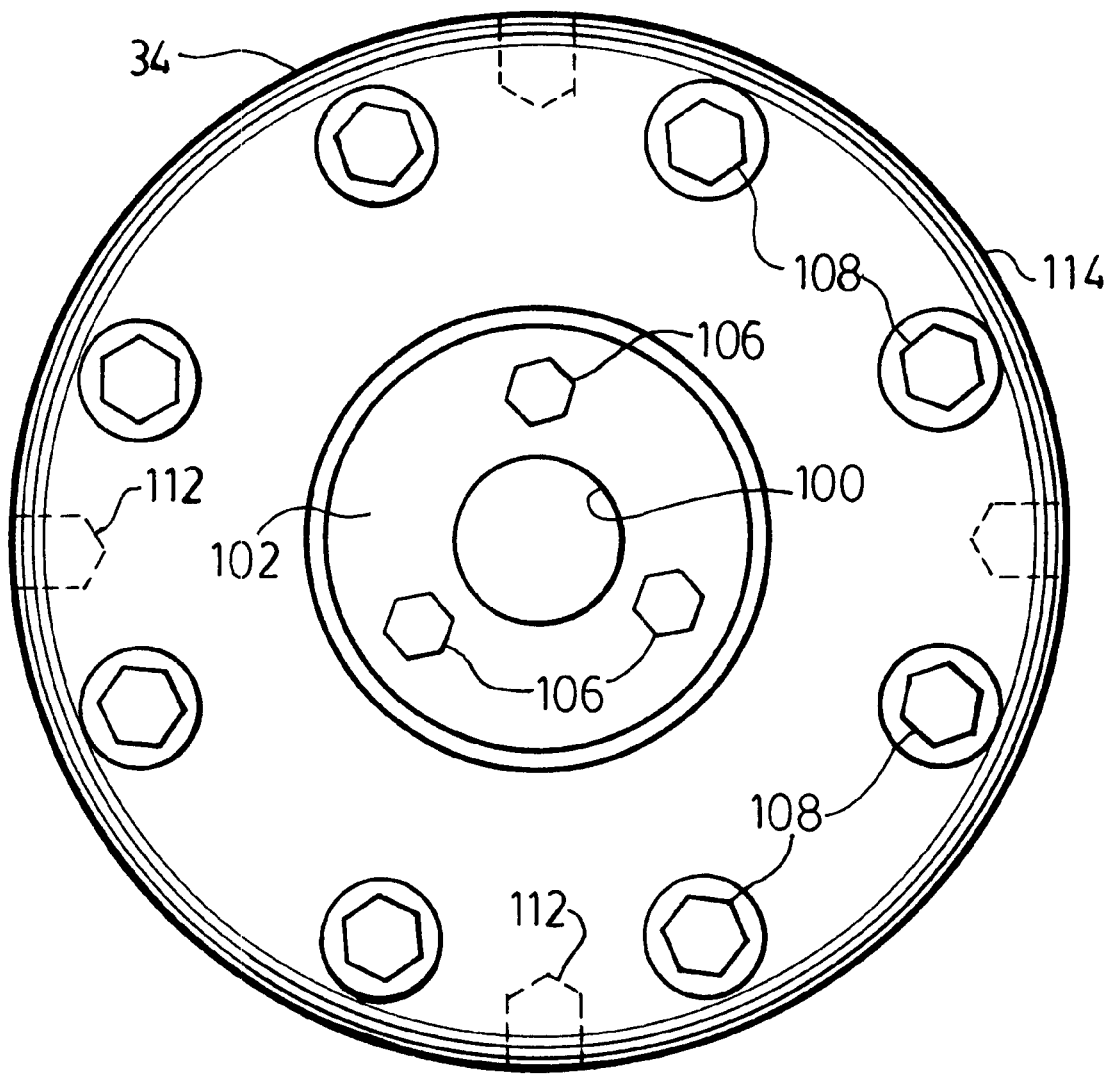

End cap 34 is shown in more detail in FIGS. 6, 6A and 6B. Cap 34 is provided with a cylindraceous recess 96 the interior surface 94 of which is threaded with buttress threads 98. Cap 34 has a central bore 100 which is surrounded by an annular recess 102 in surface 104 of the cap 34. Three threaded bores 106 are provided in recess 102 for receiving bolts 39 (shown in FIG. 1).

A series of eight evenly spaced threaded bores 108 are provided in face 104 of cap 34. Each bore is provided with an enlarged recess 110 near the surface 104. Bolts 38 will be received in bores 108.

Four evenly spaced cylindrical blind bores 112 are provided in the peripheral surface 114 of cap 34 for reception of a torquing tool used in twisting cap 34 on hub 50.

The device is assembled as follows:

Bolt 40 is threaded into bore 42 of capstan 10 until conical surface 92 of bolt 40 rests against the mating conical surface of capstan 10.

Wedge plug 44 is threaded into cavity 60 of capstan 10 until it reaches the position shown in FIG. 1.

Flinger 28 is placed on hub 50 of capstan 10 until it rests against shoulder 30. Roller 20 is next placed on hub 50 of capstan 10 with splines 74 of roll 20 engaging the recesses 52 of hub 50.

Bolts 38 are "backed off" in cap 34 to a retracted position and cap 34 is placed on the end of capstan 10 and twisted on threads 58 until it reaches its home position. The recesses 112 in the periphery of cap 34 provide means for the insertion of a tool to tighten (or loosen) cap 34 on capstan 10 to its torqued position.

When cap 34 is tightened to its specified torque on capstan 10, bolts 38 are tightened against surface 41 to a specified torque to press roll 20 and flinger 28 against shoulder 30 of capstan 10 with a predetermined force. Bolts 39 in threaded bores 106 of cap 10 are next advanced until the ends of bolts 39 engage the surface 82 of wedge plug 44. The bolts 39 are then torqued to a predetermined torque to force plug 44 to move axially in the buttress threads 62 of cavity 60 to wedge the capstan surface of hub 50 (comprising cylindrical segments 54 and depressions 52) outwardly so that the outer surfaces 54 of the hub 50 engage surfaces 72 of the central bore of roll 20 to positively center roll 20 on hub 50. When this predetermined expansion of the splined hub 50 of capstan 10 has been reached, cap 48 is threaded on bolt 40 and is advanced until it engages the surface 103 of recess 102 and is locked in place. Cap 48 prevents any access to the hex head 88 of bolt 40 during operation of the capstan.

In order to remove roll 20 from capstan 10 the opposite procedure is followed, that is cap 48 is removed from bolt 40, bolts 39 are loosened in cap 34 and cap 34 is removed by unscrewing it from threads 58 on capstan 10. Bolt 40 is now unscrewed from its home position until surface 94 engages the end plug 44 remote from hex head 84. Bolt 40 is unscrewed to push plug 44 laterally in threads 62 of capstan 10 to permit the hub surface 50 of capstan 10 to contract from its expanded size. Roll 20 may now be conveniently removed with ease.

The configuration of the spline drive has been deliberately chosen to maximize the cylindrical surface of the shaft (which has the depression formed therein) to enhance the ability of the hub to provide a concentric drive and reduce surface wear. The width of the splines on the roll (which corresponds to depression 52 on the hub) is about ½ the width of surfaces 54 of hub 50.

Because of clearances required between splines 74 on roll 20 and depressions 52 on hub 50 most of the force required for concentricity arises from surfaces 54 of hub 51.

The presence of splines 74 and recesses 52 assures that shaft torque is applied to roll 20.

The method of expanding hub has been explained using only one of the methods described in U.S. Pat. No. 5,700,233. Of course other methods will be obvious. The shape of the engaging surfaces of the hub with the roll is important. It will be found that a large portion of the hub surface is formed into the cylindrical mating surface of the hub so that concentricity is assured between the hub and the roll.

Because of the frequency of roll replacement in modern steel mills, this method of mounting and demounting the rolls on the driving capstan is swift and easy and is accomplished with a minimum inconvenience and few tools. Surface wear of the roll-capstan interface is practically non-existent and any small amounts of wear at the interface is easily compensated for by the expanding capstan.

Other advantages of this mounting technique and apparatus is the shortening of the overhanging portion of the capstan which reduces forces applied to capstan bearings and reduces fatigue of capstan drive shaft.

The diameter of the mating surface of the capstan and roll is much larger than similar prior art devices thus the strength of the shaft is drastically increased; similarly the bore size in the roll is increased thus reducing roll weight.

What is claimed:

1. A drive system for a roll in a steel mill comprising a driving capstan for driving a roll mounted on an expandable driving surface of said capstan thereon near one end of said capstan, said capstan being mounted in a suitable bearing structure to permit axial rotation of said capstan within said bearing structure, said roll having a predetermined external surface configuration for shaping a steel work product contacting said roll during passage through said mill, said roll and capstan having mating surfaces of a cylindrical nature interrupted by a series of evenly spaced intermeshing splines and wherein expanding means is provided within said capstan to expand the mating surface of said capstan.

2. A drive system as claimed in claim 1 wherein said capstan is provided with a hollow concentric cylindraceous cavity located directly beneath said roll mounted on said capstan.

3. A drive system as claimed in claim 2 wherein said cavity is enclosed by a cylinder of constant wall thickness formed in said one end of said capstan.

4. A drive system as claimed in claim 3 wherein said cavity is supplied with means to expand said cylinder.

5. A drive system as claimed in claim 4 wherein said cavity is provided with an internal buttress thread on the surface thereof, and wherein said means to expand said cylinder comprises a mating plug threaded into said cavity, movable in an axial direction by suitable force means to expand said cylinders.

6. A cantilevered drive shaft for a rolling mill comprising a shaft having suitable means for driving said shaft about its axis, said shaft having at least one bearing surface formed thereon for mounting said shaft in a bearing structure to permit said shaft to rotate about its axis, a driving hub formed at one end of said shaft for receiving a mill roll thereon, said driving hub having an abutment formed therein a spaced distance from one end of said shaft, said hub having a hollow cylinder formed in said shaft extending between said abutment and said one end of said shaft, said hub having a splined surface extending the length of said cylinder, hub expanding means enclosed within said cylinder for expanding said cylindrical surface.

7. A cantilevered drive shaft for a rolling mill as claimed in claim 6 wherein said splined surface comprises a series of axially extending depressions which occupy about one third of the surface area of said hub.

8. A cantilevered drive shaft for a rolling mill as claimed in claim 7 wherein said depressions have the form of a shallow keyway and are radially spaced at even intervals around said hub.

9. A cantilevered drive shaft for a rolling mill as claimed in claim 8 wherein the hollow cylinder is internally threaded to receive a plug and is externally threaded at said one end thereof to permit roll clamping means and lateral plug motion inducing means to be fastened to said one end of said capstan.

10. A cantilevered drive shaft as claimed in claim 9 wherein said plug and said cylinder are each provided with a shallow slope mating buttress thread.

11. A cantilevered drive shaft as claimed in claim 10 wherein said lateral plug motion inducing means comprises a plurality of bolt members threaded into a cap fastened to said one end of said capstan to apply force to said plug to cause said plug to move in a first axial direction to cause said hub surface to expand.

12. A cantilevered drive shaft as claimed in claim 11 wherein an oppositely directed axial force may be applied to said plug to move said plug in an opposite direction to permit said hub surface to contract.

13. A roll for mounting on and mating with an expandable splined capstan of a rolling mill comprising an annularly shaped member having a predetermined width, diameter and exterior surface configuration for shaping a steel work product during periods when said roll is contracting said work product during passage through said mill, said roll having a central aperture for mounting on said capstan, said aperture having formed therein a complimentary matching spline to engage said splined capstan in a working relationship, said splines extending the entire width of said roll.

14. A roll as claimed in claim 13 wherein said matching spline in said roll comprises a series of evenly spaced projecting splines which occupy an area of about one third of the total mating area of said roll and said capstan.

* * * * *